United States Patent
Rezvani (10) Patent No.: US 10,837,782 B1
(45) Date of Patent: Nov. 17, 2020

(54) DRONE-GUIDED PROPERTY NAVIGATION TECHNIQUES

(71) Applicant: Alarm.com Incorporated, Tysons, VA (US)

(72) Inventor: Babak Rezvani, Tysons, VA (US)

(73) Assignee: Alarm.com Incorporated, Tysons, VA (US)

( * ) Notice: Subject to any disclaimer, the term of this patent is extended or adjusted under 35 U.S.C. 154(b) by 362 days.

(21) Appl. No.: 15/867,016

(22) Filed: Jan. 10, 2018

Related U.S. Application Data (60) Provisional application No. 62/444,422, filed on Jan. 10, 2017.

(51) Int. Cl.

| | |
|---|---|
| *G01C 21/20* | (2006.01) |
| *G08G 5/00* | (2006.01) |
| *G06Q 50/16* | (2012.01) |
| *H04W 4/33* | (2018.01) |
| *B64C 39/02* | (2006.01) |

(52) U.S. Cl.
CPC .......... *G01C 21/206* (2013.01); *B64C 39/024* (2013.01); *G06Q 50/16* (2013.01); *G08G 5/0034* (2013.01); *G08G 5/0039* (2013.01); *G08G 5/0069* (2013.01); *H04W 4/33* (2018.02); *B64C 2201/12* (2013.01); *B64C 2201/141* (2013.01)

(58) Field of Classification Search
CPC ..... G01C 21/206; H04W 4/33; B64C 39/024; B64C 2201/141; B64C 2201/12; G08G 5/0069; G08G 5/0039; G08G 5/0034
See application file for complete search history.

(56) References Cited

U.S. PATENT DOCUMENTS

| | | | |
|---|---|---|---|
| 9,836,885 B1 | 12/2017 | Eraker et al. | |
| 9,945,677 B1 * | 4/2018 | Watts | G05D 1/0276 |
| 2006/0293839 A1 * | 12/2006 | Stankieiwcz | G01C 21/20 |
| | | | 701/434 |
| 2007/0193834 A1 * | 8/2007 | Pai | G06Q 10/08 |
| | | | 186/3 |

(Continued)

OTHER PUBLICATIONS

Burgard et al., The Interactive Museum Tour-Guide Robot, 1998, AAAI-98 Proceedings (Year: 1998).*

(Continued)

*Primary Examiner* — Thomas Ingram
(74) *Attorney, Agent, or Firm* — Fish & Richardson P.C.

(57) ABSTRACT

Techniques are described for using sensor-based objection recognition and property condition monitoring techniques to automate and improve methods of navigating a property during a property tour. In some implementations, sensor data is received from one or more sensors that are located within a property. Property data that identifies characteristics of the property is received. A model of the property is generated. Authentication data that identifies users who are authorized to access the property is received. Data identifying a visiting user is received. The data identifying the visiting user is compared to the authentication data. The visiting user is determined to be authorized to access the property. Preference data that indicates preferences of the visiting user is accessed. A path to guide the user around the property is generated based on the model of the property and the preferences of the visiting user.

22 Claims, 5 Drawing Sheets

(56) References Cited

U.S. PATENT DOCUMENTS

| | | |
|---|---|---|
| 2014/0011814 A1 | 5/2014 | Amis |
| 2014/0172727 A1 | 6/2014 | Abhyanker et al. |
| 2015/0010933 A1 | 4/2015 | McKinnon et al. |
| 2015/0012748 A1 | 5/2015 | Advani |
| 2016/0063642 A1 | 3/2016 | Luciani et al. |
| 2016/0088286 A1 | 3/2016 | Forsythe et al. |
| 2017/0011477 A1* | 1/2017 | Murphey ............... G06Q 50/16 |
| 2018/0005143 A1* | 1/2018 | Camargo .............. H04W 12/04 |

OTHER PUBLICATIONS

Burgard et al., Experiences with an interactive museum tour-guide robot, May 5, 1999, Elsevier Science B.V. PII: S004-3702 (99) 00079-3 (Year: 1999).*

* cited by examiner

```
┌─────────────────────────────────────────────────────────────┐
│         OBTAIN DATA ASSOCIATED WITH A PROPERTY              │
│                                                         210 │
└─────────────────────────────────────────────────────────────┘
                              │
                              ▼
┌─────────────────────────────────────────────────────────────┐
│  OBTAIN DATA ASSOCIATED WITH A USER WHO REQUESTED A TOUR OF │
│                       THE PROPERTY                          │
│                                                         220 │
└─────────────────────────────────────────────────────────────┘
                              │
                              ▼
┌─────────────────────────────────────────────────────────────┐
│   DETERMINE THAT THE USER IS AUTHORIZED TO TOUR THE PROPERTY│
│                                                         230 │
└─────────────────────────────────────────────────────────────┘
                              │
                              ▼
┌─────────────────────────────────────────────────────────────┐
│   DETERMINE A TOUR PATH TO GUIDE THE USER THROUGH THE PROPERTY│
│                                                         240 │
└─────────────────────────────────────────────────────────────┘
                              │
                              ▼
┌─────────────────────────────────────────────────────────────┐
│  PERFORM THE TOUR OF THE PROPERTY FOR THE USER ALONG THE TOUR│
│                            PATH                             │
│                                                         250 │
└─────────────────────────────────────────────────────────────┘
```

DRONE-GUIDED PROPERTY NAVIGATION TECHNIQUES

CROSS-REFERENCE TO RELATED APPLICATIONS

This application claims the benefit of U.S. Provisional Patent Application No. 62/444,422, filed on Jan. 10, 2017 and titled "DRONE-GUIDED PROPERTY TOURING TECHNIQUES," which is incorporated herein by reference in its entirety.

TECHNICAL FIELD

This disclosure relates to home monitoring technology.

BACKGROUND

Property management organizations often provide prospective buyers or renters of a property with tours. Information related to the property may be provided during the tour to provide the buyer or renter with an interactive experience. Such tours are often manually performed by an authorized individual such as a property owner, real estate agent, or leasing office staff.

SUMMARY

Techniques are described for using sensor-based objection recognition and property condition monitoring techniques to automate and improve techniques of navigating a property during a property tour. Sensor data collected by on-board sensors of a drone device and/or sensing devices located within a property can be used to identify a present condition of a property prior to, during, or after a property tour. For example, a drone device is configured to periodically monitor a present condition of the property to automatically determine an optimal time period to initiate a property tour. As another example, a drone device can be configured to use real-time object recognition and/or image analysis techniques to dynamically navigate a property to guide a visitor during a property tour. For example, the drone device can detect ambient lighting conditions to determine an optimal pathway for guiding a user through a property.

A drone device can be configured be operate within and/or in conjunction with a monitoring system of a property. For instance, the drone device can periodically exchange data communications with sensing devices of the monitoring system to determine a present condition of a property with respect to a property tour. Sensor data collected the sensing devices can be used to augment and/or adjust determinations made by on-board sensors of the drone device during a property tour. For example, presence data collected by occupancy sensors of a occupied property for sale can be used by the drone device to determine that a property is presently occupied and available for touring. As another example, during a tour of a property, temperature data collected in real-time by a thermostat can be used by the drone device to determine that certain regions of the property are not suitable for displaying.

The drone device is capable of using various types of processing techniques to automate a property tour. For example, the drone device can generate a three-dimensional model of the physical environment to determine a tour path for navigating a user through a property during a property tour. For example, the drone device can automatically determine a tour path for performing a property tour based on identifying certain points of interest within the physical environment of the property, such as types of property regions, the floor plan of the property, and certain regions of interest that are of interest to a visitor of the property tour.

The techniques used by the drone device can be used to perform a property tour within a property without requiring the physical presence and/or attendance of any type of property administrator (e.g., property owner, real estate agent, property leasing office staff, etc.). For example, the drone device can be configured to perform automatically perform certain actions during a property tour, such as turning lights on and off, locking and unlocking doors, adjusting window blinds, enabling or disabling appliances, among other actions. In some implementations, the drone device can be configured to perform such actions based on receiving voice queries from a visitor of the property.

The drone device can also be configured to receive and process user queries during a property tour to allow the automated tour to be interactive. For instance, the drone device can be capable of receiving a user query related to the property, and in response, parse a collection of stored property information to provide to provide an output responsive to the user query (e.g., speech output, textual display, projection display, etc.). In some instances, the drone device can be capable of dynamically adjusting preconfigured tour data based on user information (e.g., user priorities, user preferences, etc.), or user input received while performing the automated tour. In this regard, the drone device can be capable to customizing a preconfigured tour to the specific needs and preferences of any individual user.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings.

DETAILED DESCRIPTION

In general, techniques are described for using sensor-based objection recognition and property condition monitoring techniques to automate and improve techniques for navigating a property during a property tour. Sensor data collected by on-board sensors of a drone device and/or sensing devices located within a property can be used to identify a present condition of a property prior to, during, or after a property tour. For example, a drone device is configured to periodically monitor a present condition of the property to automatically determine an optimal time period to initiate a property tour. As another example, a drone device can be configured to use real-time object recognition and/or image analysis techniques to dynamically navigate a property to guide a visitor during a property tour. For example, the drone device can detect ambient lighting conditions to determine an optimal pathway for guiding a user through a property.

A drone device can be configured be operate within and/or in conjunction with a monitoring system of a property. For instance, the drone device can periodically exchange data communications with sensing devices of the monitoring system to determine a present condition of a property with respect to a property tour. Sensor data collected the sensing devices can be used to augment and/or adjust determinations made by on-board sensors of the drone device during a property tour. For example, presence data collected by occupancy sensors of an occupied property for sale can be used by the drone device to determine that a property is presently occupied and available for touring. As another example, during a tour of a property, temperature data collected in real-time by a thermostat can be used by the drone device to determine that certain regions of the property are not suitable for displaying.

As described herein, a "property administrator" refers to an individual or an entity that controls access to a rental property. For example, in some instances, a property administrator may be a property owner that retains property title to the property to be rented. In other instances, the property administrator may be an authorized agent of the property owner that manages and rents the property on behalf of the property owner. The property administrator specifies a set of access conditions that are associated with the rental of a property. For example, the property administrator may specify the cost of rental, time periods of availability, or services that are offered along with the property rental.

A "user" (or "visitor") refers to an individual that requests to view a property that is made available for rent or purchase by the property administrator. The user can submit requests for property tours through various mediums such as sending a direct email to the property administrator, placing a request through a property rental webpage, and/or through an application that provides property rental services.

Figure 1:
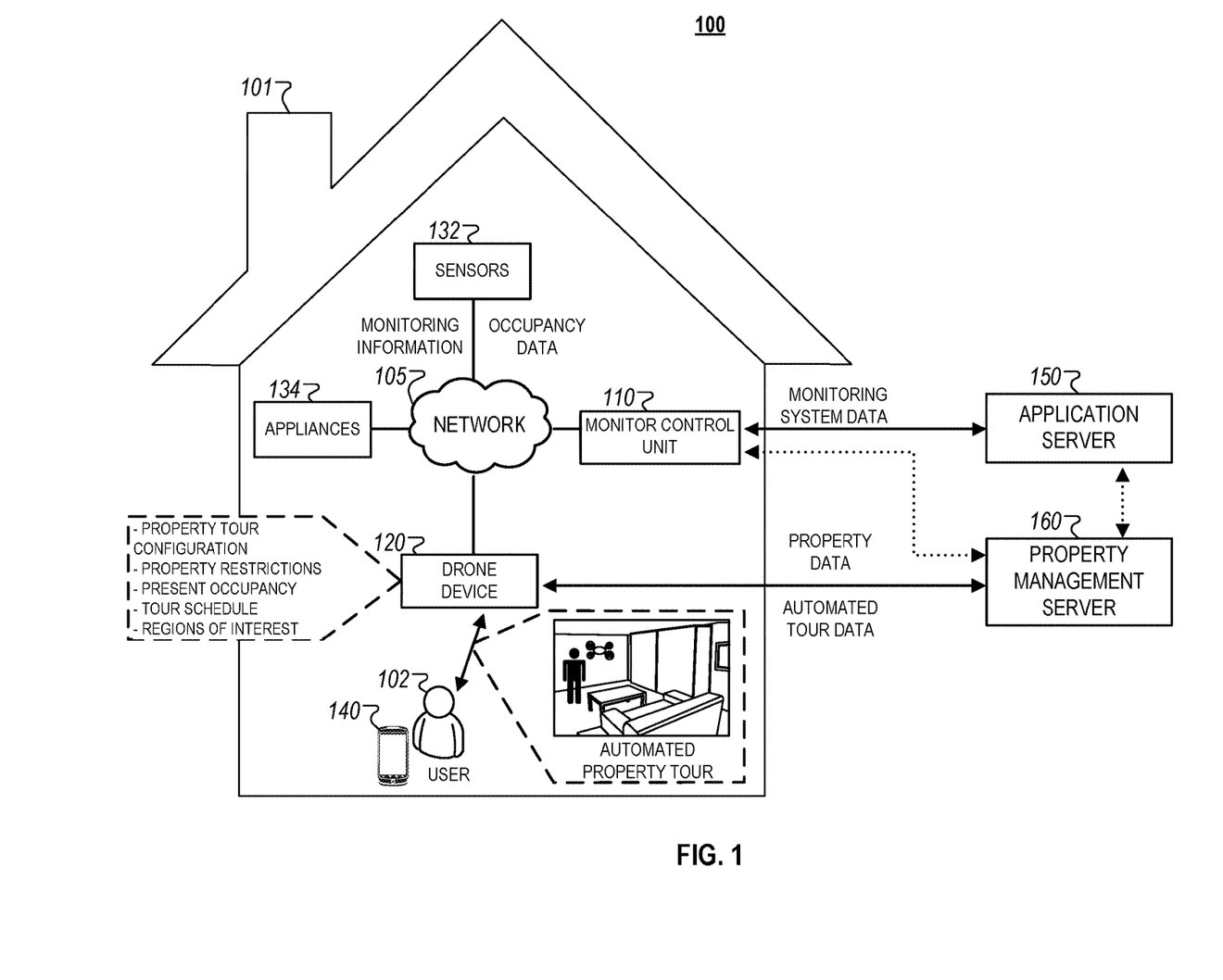
FIG. 1 illustrates a block diagram of an example of a system that is capable of performing automated property tours.

FIG. 1 illustrates an example of an electronic system 100 that is capable of performing automated property tours. The electronic system 100 includes a monitor control unit 110, a drone device 120, sensors 132, appliances 134, and a user device 140, an application server 150, and a property management server 160 connected over a network 105 within a property 101.

In general, the system 100 enables a property administrator associated with a property management server 160 to configure the drone device 120 to perform an automated tour of the property 101 without requiring an authorized user to be physically present within the property 101 during the tour. The drone device 120 may initially be configured obtain property data and automated tour data from the property management server 160. The property data can include various types of information related to the property that is pertinent to a prospective purchaser or buyer (e.g., purchase price, square footage, renovation information, neighborhood information, etc.). The automated tour data can include a specified tour path through which the drone device 120 shows the property 101 to the user 102.

The drone device 120 may also be configured to exchange obtain monitoring system data over the network 105 with various devices located within the property 101. The monitoring system data may include, for example, sensor data collected by the sensors 132, a present security status associated with the property 101, data for operating the appliances 134, among others.

The monitoring system data obtained by the drone device 120 can then be used to customize and/or adapt an automated tour to the present conditions of the property 101 and/or the actions taken by the user 102 prior to or during the tour. For example, prior to initiating a scheduled tour, the drone device 120 may obtain sensor data collected from the sensors 132 and/or the monitor control unit 110 in order to determine if the property 101 is in a suitable condition to provide a scheduled tour to the user 102. The drone device 120 may automatically reschedule the scheduled tour in instances where the property 101 is not determined to be in a suitable condition. In another example, sensor data collected by devices located within the property 101 while performing an automated tour may be used to perform specified actions in response to user action (e.g., enabling/disabling lights in regions based on detected user movement, providing device information based on a user's detected use of a particular appliance 134, etc.).

Referring now to the components of system 100, the network 105 is configured to enable exchange of electronic communications between devices connected to the network 105. For example, the network 105 may be configured to enable exchange of electronic communications between the monitor control unit 110, the drone device 120, the sensors 132, the appliances 134, the user device 140, and the application server 150.

The network 105 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 105 may include multiple networks or subnetworks, each of which may include, for example, a wired or wireless data pathway.

The network 105 may include a circuit-switched network, a packet-switched data network, or any other network able to carry electronic communications (e.g., data or voice communications). For example, the network 105 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 105 may include one or more networks that include wireless data channels and wireless voice channels. The network 105 may be a wireless network, a broadband network, or a combination of networks including a wireless network and a broadband network.

The monitor control unit 110 includes a controller and a network module. The controller is configured to control a monitoring system (e.g., a home alarm or security system) that includes the drone device 120. In some examples, the controller may include a processor or other control circuitry configured to execute instructions of a program that controls operation of an alarm system. In these examples, the controller may be configured to receive input from sensors, detectors, or other devices included in the alarm system and control operations of devices included in the alarm system or other household devices (e.g., a thermostat, an appliance, lights, etc.). For example, the controller may be configured to control operation of the network module included in the drone device 120.

The network module is a communication device configured to exchange communications over the network 105. The network module may be a wireless communication module configured to exchange wireless communications over the network 105. For example, the network module may be a wireless communication device configured to exchange communications over a wireless data channel and a wireless voice channel. In this example, the network module may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module also may be a wired communication module configured to exchange communications over the network 105 using a wired connection. For instance, the network module may be a modem, a network interface card, or another type of network interface device. The network module may be an Ethernet network card configured to enable the drone device 120 to communicate over a local area network and/or the Internet. The network module also may be a voiceband modem configured to enable the alarm panel to communicate over the telephone lines of Plain Old Telephone Systems (POTS).

The drone device 120 may be an unmanned device that is capable of movement through the property 101 to perform an automated property tour. For example, the drone device 120 may be capable of moving throughout a property based on automated control technology and/or user input control provided by either the user 102 or by the application server 150. In such an example, the drone device 120 may be able to fly, roll, walk, or otherwise move about the property 101.

The drone device 120 may be configured and managed by a property management entity associated with the property management server 160. For example, in some implementations where the property management entity is a real estate firm that manages property listings for sale, the drone device 120 may be configured to operate within a given property listing and perform automated property tours in accordance with policies of the real estate firm. In other implementations where the property management entity is an individual property owner, the drone device 120 may be configured to operate based on a set of user-defined settings for performing an automated property tour for the property 101.

The drone device 120 may include helicopter type devices (e.g., quad copters), rolling helicopter type devices (e.g., roller copter devices that can fly and also roll along the grounds, walls, or ceiling), land vehicle type devices (e.g., automated cars that drive around a property), and plane type devices (e.g., unmanned aircraft). In some instances, the drone device 120 may be robotic devices that are intended for other purposes and merely associated with the system 100 for use in appropriate circumstances. For instance, a security drone may be associated with the system 100 as the drone device 120 and may be controlled to take action responsive to monitoring system events.

The drone device 120 can be configured to automatically navigate within the property 101. For instance, the drone device 120 may include sensors and control processors that guide movement of the drone device 120 within the property 101. The drone device 120 may navigate within the property 101 using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The drone device 120 may include control processors that process output from the various sensors and control the drone device 120 to move along a path that reaches the desired destination and avoids obstacles. In this regard, the control processors detect walls or other obstacles in the property and guide movement of the drone device 120 in a manner that avoids the walls and other obstacles.

In addition, the drone device 120 may store data that describes attributes of the property. For instance, the drone device 120 may store a floorplan and/or a three-dimensional model of the property that enables the drone device 120 to navigate the property. During initial configuration, the drone device 120 may receive the data describing attributes of the property 101, determine a frame of reference to the data (e.g., a home or reference location in the property), and navigate the property 101 based on the frame of reference and the data describing attributes of the property 101.

Further, initial configuration of the drone device 120 also may include learning of one or more navigation patterns in which a property administrator provides input to control the drone device 120 to perform a specific navigation action (e.g., fly to an upstairs bedroom and spin around while capturing video and then return to a home charging base). In this regard, the drone device 120 may learn and store the navigation patterns such that the drone device 120 may automatically repeat the specific navigation actions when instructed to perform an automated tour.

In some examples, the drone device 120 may include data capture and recording devices. In these examples, the drone device 120 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the property and users in the property.

In some implementations, the drone device 120 may include output devices. In these implementations, the drone device 120 may include one or more displays, one or more speakers, one or more projectors, and/or any type of output devices that allow the drone device 120 to communicate information to a nearby user. The one or more projectors may include projectors that project a two-dimensional image onto a surface (e.g., wall, floor, or ceiling) and/or holographic projectors that project three-dimensional holograms into a nearby space.

The drone device 120 also may include a communication module that enables the drone device 120 to communicate other devices of the system 100. The communication module may be a wireless communication module that allows the drone device 120 to communicate wirelessly. For instance, the communication module may be a Wi-Fi module that enables the drone device 120 to communicate over a local wireless network at the property. The communication module further may be a 900 MHz wireless communication module that enables the drone device 120 to communicate directly with a monitoring system control unit. Other types of short-range wireless communication protocols, such as Bluetooth, Bluetooth LE, Zwave, ZigBee, etc., may be used to allow the drone device 120 to communicate with other devices in the property.

The drone device 120 further may include processor and storage capabilities. The drone device 120 may include any suitable processing devices that enable the drone device 120 to operate applications and perform the actions described throughout this disclosure. In addition, the drone device 120 may include solid state electronic storage that enables the drone device 120 to store applications, configuration data, collected sensor data, and/or any other type of information available to the drone device 120.

The drone device 120 may be associated with a charging station. The charging station may be located at a predefined or reference location within the property 101. The drone device 120 may be configured to navigate to the charging station after completion of an automated property tour. For instance, after completion of a property tour or upon instruction by the monitoring system control unit 110, the drone device 120 may be configured to automatically fly to and land on one of the charging station. In this regard, the drone device 120 may automatically maintain a fully charged battery in a state in which the drone device 120 are ready for use by the system 100.

The charging station may be a contact-based charging stations and/or wireless charging stations. For contact based charging stations, the drone device 120 may have readily accessible points of contact that the drone device 120 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the drone device 120 may charge through a wireless exchange of power. In these cases, the drone device 120 need only locate themselves closely enough to the wireless charging stations for the wireless exchange of power to occur. In this regard, the positioning needed to land at a predefined home base or reference location in the property may be less precise than with a contact-based charging station. Based on the drone device 120 landing at a wireless charging station, the wireless charging station outputs a wireless signal that the drone device 120 receive and convert to a power signal that charges a battery maintained on the drone device 120.

As described above, the drone device 120 may exchange communications with the monitor control unit 110, the sensors 132, the appliances 134, the user device 140, the application server 150, and/or the property management server 160 over the network 105 or any other suitable communication means. For example, the drone device 120 may utilize a wireless data pathway configured to transmit signals from the monitor control unit 110, the sensors 132, the appliances 134, the user device 140, the application server 150, and/or the property management server 160 to a controller. The monitor control unit 110, the sensors 132, the appliances 134, the user device 140, the application server 150, and/or the property management server 160 may continuously transmit sensed values to the controller, periodically transmit sensed values to the drone device 120, or transmit sensed values to the drone device 120 in response to a change in a sensed value.

In some implementations, the drone device 120 may additionally be used to perform routine surveillance operations on a property. For instance, the drone device 120 may be assigned to one or more particular properties within a geographic location and may routinely collect surveillance footage during specified time periods (e.g., after dark), which may then be transmitted to the application server 150 and/or the property management server 160 for transmitting back to each particular property owner. In such implementations, the property owner may receive the surveillance footage over the network 105 as a part of a service provided by a security provider that operates the application server 150 and/or the property management server 160. For example, transmissions of the surveillance footage collected by the drone device 120 may be part of a premium security service package provided by a security provider in addition to the routine drone emergency response service.

In some implementations, the drone device 120 may monitor the operation of the monitor control unit 110, the sensors 132, the appliances 134, the user device 140, the application server 150, and/or the property management server 160. For instance, the drone device 120 may enable or disable the devices located within the property 101 based on a set of rules associated with energy consumption, user-specified settings, and/or other information associated with conditions prior to, during, or after an automated property tour.

In some examples, the drone device 120 may be used as a replacement to a traditional security panel (or monitor control unit) that is used to monitor and control the operations of the system 100. In other examples, the drone device 120 may coordinate monitoring operations with a separate security panel of the system 100. In such examples, the drone device 120 may monitor particular activities of the devices of the system 100 that are not monitored by the security panel, or monitor the operation of particular devices that are not monitoring by the security panel.

The system 100 also includes one or more sensors or detectors. For example, the monitoring system may include multiple sensors 132. The sensors 132 may include a contact sensor, a motion sensor, a glass break sensor, or any other type of sensor included in an alarm system or security system. The sensors 132 also may include an environmental sensor, such as a temperature sensor, a water sensor, a rain sensor, a wind sensor, a light sensor, a smoke detector, a carbon monoxide detector, an air quality sensor, etc. The sensors 132 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 132 may include a radio-frequency identification (RFID) sensor that identifies a particular article that includes a pre-assigned RFID tag.

In some implementations, the sensors 132 may include one or more cameras. The cameras may be video/photographic cameras or other type of optical sensing devices configured to capture images. For instance, the cameras may be configured to capture images of an area within a building monitored by the monitor control unit 110. The cameras may be configured to capture single, static images of the area and also video images of the area in which multiple images of the area are captured at a relatively high frequency (e.g., thirty images per second). The cameras may be controlled based on commands received from the monitor control unit 110.

The appliances 134 may be home automation devices connected to the network 105 that are configured to exchange electronic communications with other devices of the system 100. The appliances 134 may include, for example, connected kitchen appliances, controllable light sources, safety and security devices, energy management devices, and/or other types of electronic devices capable of exchanging electronic communications over the network 105. In some instances, the appliances 134 may periodically transmit information and/or generated data to the monitor control unit 110 such that the monitor control unit 110 can automatically control the operation of the appliances 134 based on the exchanged communications. For example, the monitor control unit 110 may operate one or more of the appliances 134 based on a fixed schedule specified by the user. In another example, the monitor control unit 110 may enable or disable one or more of the appliances 134 based on received sensor data from the sensors 132.

The user device 140 may be any type of personal electronic computing device that is associated with the user 102 that visits the property 101 for an automated property tour. The user device 140 may be one or more of a cellular telephone, smartphone, a tablet computing device, a laptop computing device, a desktop computing device, a wearable device, or any other type of network-enabled electronic device.

The user device 140 may include a native application that enables communications with devices located within the property 101 through the application server 150 and/or the property management server 160. The native application refers to a software/firmware program running on the user device 140 that enables various features. For instance, the user device 140 may load or install the native application based on data received over a network 105 or data received from local media. The native monitoring application may run on mobile devices' platforms, such as Apple iOS, iPhone, iPod touch, Blackberry, Google Android, Windows Mobile, etc.

In some implementations, the native application of the user device 140 identifies a geographic location associated with the user device 140 and communicates information identifying the geographic location. For example, the user device 140 having the native application may determine a geographic location of the user device 140 using GPS capabilities, and may communicate data identifying the geographic location to the application server 150. In some instances, the native application may check the location of the user device 140 periodically and may detect when the user 102 is presently located inside or outside the property 101. Location data associated with the user device 140 can then be used by the drone device 120 to determine when a user 102 has arrived at the property 101 for an automated property tour.

For example, the user 102 may use the native application to view listings for properties that are available for rent or purchase by the property administrator. The user 102 may then select a listing and then schedule an automated property tour for the property associated with the listing. In response to a listing selection by the user 102, the application server 150 and/or the property management server 160 may obtain device information for the user device 140 and/or user information for the user 102 through the native application and transmit the obtained data to the monitor control unit 110 and/or the drone device 120. In this regard, the native application enables the monitor control unit 110 and/or drone device 120 enable data communications with the user device 140 without requiring the user device 140 to connect to the network 105.

Additionally, or alternatively, the user device 140 may communicate with the control unit 110 and/or the drone device 120 using various local wireless protocols, such as Wi-Fi, Bluetooth, Z-Wave, ZigBee, Home Plug, HPAV, HPAV2, G.hn (Ethernet over power line), or wired protocols such as Ethernet, USB, and other wired protocols based on the RS232, RS485, and/or RS422 standards.

The application server 150 may be an electronic device configured to provide monitoring services by exchanging electronic communications with the monitor control unit 110, the drone device 120, the sensors 132, and the appliances 134 over the network 105. The application server 150 may also exchange communications with the user device 140 through the network 105, or alternatively, through another suitable network connection.

The application server 150 may be configured to monitor events (e.g., alarm events) generated by the monitor control unit 110 and/or the drone device 120. For example, the application server 150 may exchange electronic communications with the network module included in the monitor control unit 110 to receive information regarding events (e.g., alarm events) detected by the monitoring system control unit 110. The application server 150 also may receive information regarding events (e.g., alarm events) from the drone device 120.

The application server 150 may store sensor and image data received from the monitoring system and perform analysis of sensor and image data received from the monitoring system. Based on the analysis, the application server 150 may communicate with and control aspects of the monitoring system control unit 110 or the one or more user devices 140, 150.

The property management server 160 may be a remote monitoring server operated and managed by a property administrator. The property management server 160 may store property information for listings of properties that are available for sale or rent, route travel data associated with each of the available properties, and/or other types of associated information that can be used by the drone device 120 prior to, during, or after performing an automated property tour. For example, the property management server 160 may store configuration data for the drone device 120 that provides instructions on property information to be presented to the user during the automated property tour, a guide order for performing the automated property tour, and/or stored property information that can be provided for output to the user 102 in response to a specific user query about the property 101. The property management server 160 may additionally store schedule information for the property 101 that includes a list of users that have appointments to view the property 101 on a given date and the corresponding times for each appointment.

Figure 2:
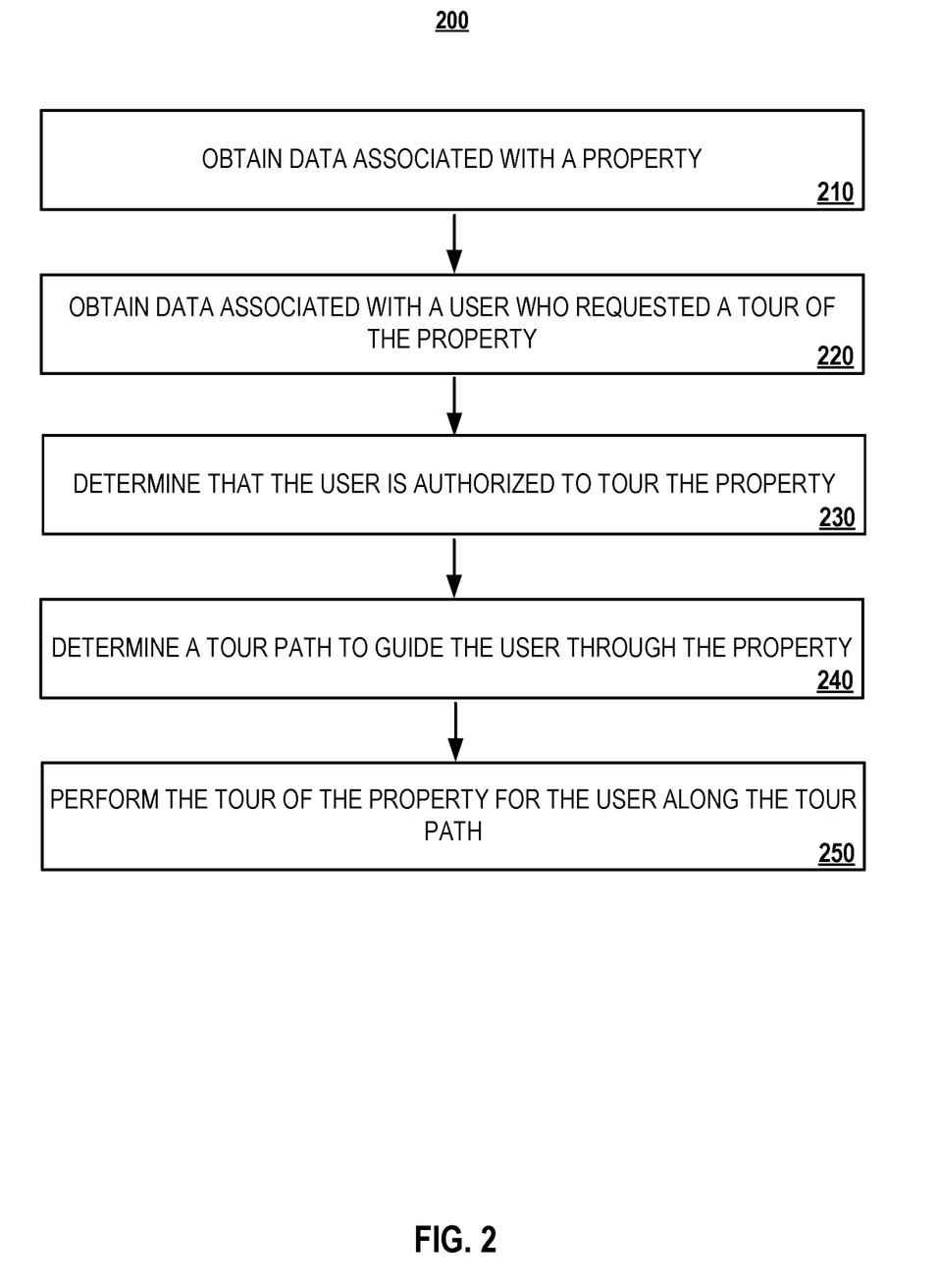
FIG. 2 illustrates an example of a process for performing an automated property tour by a drone device.

FIG. 2 illustrates an example of a process 200 for performing an automated property tour by a drone device. The process 200 may include obtaining data associated with a property (210), obtaining data associated with a user who requested a tour of a property (220), determining that the user is authorized to tour the property (230), determining a tour path to guide the user through the property (240), and performing the tour of the property for the user along the tour path (250).

In more detail, the process 200 may include obtaining data associated with a property (210). For instance, the drone device 120 may obtain data from the application server 150 and/or the property management server 160 associated with the property 101. As described above, the obtained data can include, for example, general property information (e.g., build date, renovation date, number of bedrooms/bathrooms), information for the neighborhood surrounding the property 101, or other types of property listing information that is stored on the property management server 160. The obtained data may also include monitoring system data associated with the devices located within the property 101. For example, the obtained monitoring system data can include sensor data collected by the sensors 132 indicating a present condition of the property 101, configuration data for controlling the operation of the appliances 134 prior to, during, or after the automated property tour, or other types of monitoring system data associated with the system 100. The obtained data may also include a floorplan and/or a three-dimensional model of the property. In some implementations, instead of receiving a floor plan and/or a three-dimensional model, the drone device 120 may also survey the property and generate a floorplan and/or three-dimensional model based on the survey.

The process 200 may include obtaining data associated with a user who requested a tour of a property (220). For instance, the drone device 120 may obtain data associated with the user 102 that is scheduled to view a tour of the property 101. The obtained data can include, for example, account information associated with a user account used by the user 102 to access a property listing for the property 101 (e.g., user profile data), device information for the user device 140 to enable communications between the drone device 120 and the user device 140, or data indicating an appointment time for when the user 102 is scheduled to view an automated property tour.

The process 200 may include determining that the user is authorized to tour the property (230). For instance, the user 102 arrives at the property 101 for a scheduled property tour, the drone device 120 may initially request the user 102 to provide verification information confirm his/her identity as the user that is associated with data obtained in step 220. In some implementations, the drone device 120 may request the user 102 to provide a one-time passcode that is associated with the scheduled appointment. In other implementations, the drone device 120 may collect biometric and/or facial verification data from the user 102 and compare the collected data against user credential data stored at the application server 150 and/or the property management server 160. In some implementations, the drone device 120 may verify the user 102 based on the device 140. The drone device 120 may communicate with an application on the device 140, the application server 150, and/or the property management server 160 to verify the user is authorized to view the property. The property management server 160 and/or the application server 150 may compare data stored on either server with data stored on the device 140 to confirm that the device 140 corresponds to the user 102 who was previously authorized to tour the property. For example, the data may include a code previously provided by the property management server 160 and/or the application server 150 when the user 102 requested the tour.

The process 200 may include determining a tour path to guide the user through the property (240). For instance, the drone device 120 may determine a tour path to guide the user 102 through the property 101 based on the property data obtained from the property management server 160 in step 210. As described above, a tour path may specify a particular order of regions within the property 101 to guide the user 102 through the property and property information associated with each of the regions within the property 101. For example, the property administrator may pre-configure the tour path at an earlier time frame based on a preferred touring technique. The pre-configured tour path can then be stored on the property management server 160.

In some implementations, the drone device 120 may customize a tour path for specifically for the user 102 by adjusting the tour path configuration based on user-specific data obtained in step 220. For example, as described above, the drone device 120 may obtain a list of property attributes that the user 102 considers to be a priority in his/her purchasing or rental decision. The drone device 120 may then re-arrange the pre-configured tour path to guide the user 102 through high priority regions of the property 101 before guiding the user 102 to lower priority regions of the property 101. In another example, pre-configured tour path data can be adjusted based on aggregating tour path data from previously performed property tours with other users and making adjustments based on user input from the previously performed property tours.

The process 200 may include performing the tour of the property for the user along the tour path (250). For instance, the drone device 120 may initiate an automated property tour of the property 101 for the user 102 based on the tour specifications included within the tour path data. Examples of tour specifications used by the drone device 120 to perform the automated property tour are illustrated in more detail in FIG. 3 below.

Although the descriptions above in FIGS. 1 and 2 for an automated property tour are in relation to the user 102 being physically guided through the property 101 by the drone device 120, in some implementations, the automated property tour may instead be a virtual tour. In such implementations, the user 102 may remotely access a video feed collected by the drone device 120 as it is automatically navigating through the property 101 along the specified tour path. The user 102 may access the video feed through a native application on the user device 140 or any other mobile device or a webpage. The drone device 120 may verify user authorization by requiring the user 102 to submit user credentials (e.g., username and password), a one-time code for the virtual property tour, or other types of user authentication data. Once the drone device 120 has initiated that virtual property tour, the user 102 may electronically transmit remote commands or queries to be performed by the drone device 120 within the property 101. For example, the user 102 may request additional information for a property region that is being displayed in the video feed of the virtual property tour. In another example, the user 102 may remotely transmit navigation instructions that dynamically adjust the movement of the drone device 120 through the property 101 during the virtual property tour.

Figure 3:
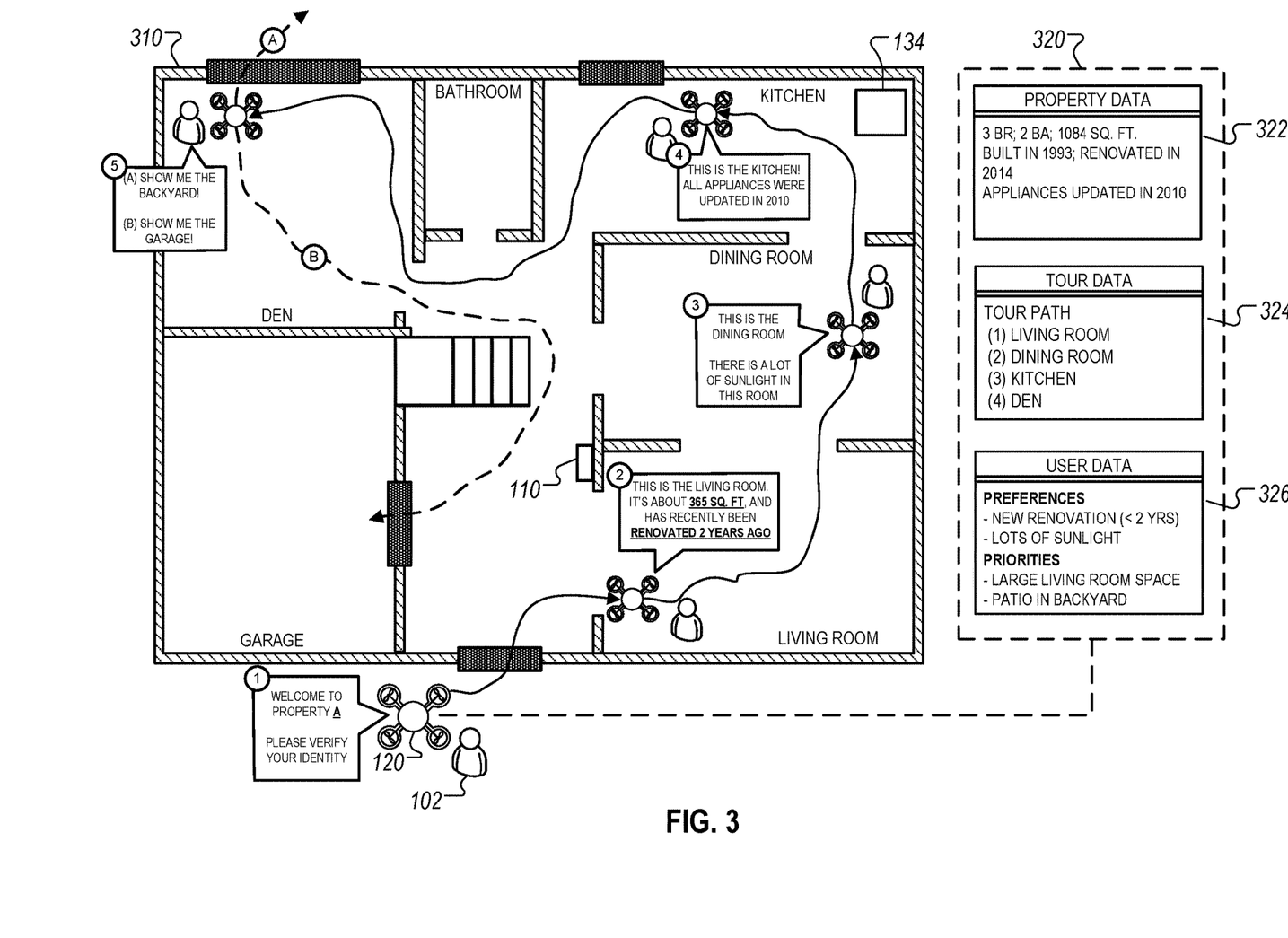
FIG. 3 illustrates a top view of a property where a drone performs an automated property tour.

FIG. 3 illustrates a top view of a property 310 where the drone device 120 performs an automated property tour for the user 102. The example of the automated property tour depicted proceeds in the following steps: (1) the user 102 is initially greeted at the front door of the property 310, (2) user 102 is provided with an overview of the living room, (3) the user 102 is provided with an overview of the dining room, (4) the user 102 is provided an overview of the kitchen, and (5) the user 102 provides a command to view a specific region of the property, and in response, the drone device 120 directs the user to the selected property region.

In general, the drone device 120 performs the automated property tour based on configuration data 320 obtained from the application server 150, the property management server 160, or both. The obtained configuration data 320 includes property data 322, which includes property listing information (e.g., number of bedrooms/bathrooms, overall property size, renovation information, appliance information, etc.). The configuration data 320 also includes tour data 234, which specifies a pre-configured tour path for the drone device 120 to follow as it navigates through the property 310 during an automated property tour. The configuration data 320 further includes user data 326, which includes a set of user preferences and user priorities for an ideal property that were previously identified based on user activity data on an account of the user 102 (e.g., prior listing searches, user profile information, user submissions on surveys, etc.). The use of each of the different types of configuration data 320 by the drone device 120 in each step is described in greater detail below.

Referring initially to step (1), the drone device 120 determines, using various techniques, that the user 102 has arrived at the property 310. In some implementations, the drone device 120 monitors the data collected by a front door camera in relation to schedule data indicating appointments for scheduled property tours, and determines that the user 102 has arrived at the property based on receiving an indication from the front door camera that an individual has been detected at the front door of the property 310. In other implementations, the drone device 120 may wait to receive an instruction from the monitor control unit 110 and/or application server 150 that user 102 has arrived. In such implementations, the user 102 may, for example, provide a confirmation on an application running on the user device 140, which in turn transmits a notification to the application server 150. In yet another implementation, the drone device 120 may receive a remote command from the property management server 160 indicating that the user 102 has arrived at the property 310.

Once the drone device 120 has confirmed that the user 102 has arrived at the property 310, the drone device 120 may request that the user 102 provide information to establish his/her identity as the user that is associated with the scheduled property tour. As described above, in some implementations, the drone device 120 may present an interface that requests the user 102 to provide user credentials to authenticate his/her identity (e.g., username/password combination, one-time passcode, security token, etc.). In other implementations, the drone device 120 may collect biometric, facial, or other types of sensed information and compare the collected data to verify user account information stored on the application server 150 and/or the property management server 160.

Referring now to step (2), once the drone device 120 has verified that the user 102 has the authority to explore the property 310, the drone device 120 initially guides the user 102 to the living room of the property 310. In this example, the drone device 120 determines to navigate to the living room based on tour path within the tour data 324 indicating that the living room is the first region of the property 310 that should be displayed to the user 102.

After navigating to the living room, the drone device 120 provides some basic information for the living room such as its size and an indication that this region has been renovated two years ago. As described above, this information can be provided in a variety of formats. In some implementations, the drone device 120 provides a synthesized speech output. Additionally, or alternatively, in some implementations where the drone device 120 includes one or more display elements, the drone device 120 may provide a textual output of the information for display on a user interface. In the example depicted, the drone device 120 obtains the size and renovation information about the living room from the property data 320.

Referring now to step (3), after providing the user 102 with an overview of the living room, the drone device 120 then guides the user 102 to the dining room of the property 310. As described above in step (2), this decision is based on the tour path within the tour data 234 indicating that the dining room is the next region of the tour path after the living room.

After navigating to the dining room, the drone device 120 provides information relating to the amount of sunlight that is received in the dining room. Compared to step (2), where drone device 120 provide general property information for output to the user 102, in this step, the drone device 120 provides information that is indicated within the user data 326 to be a user preference for a property of interest. In some implementations, the drone device 120 may determine to provide this type of specific information by cross-referencing user preferences within the user data 326 and property information within the property data 322, and selecting subsets of property information that include property attributes that are most likely to be a preference for the user.

Referring now to step (4), after providing the user 102 with an overview of the dining room, the drone device 120 then guides the user 102 to the kitchen of the property 310. This decision is based on the tour path within the tour data 234 indicating that the kitchen is the next region of the tour path after the dining room.

After navigating to the kitchen, the drone device 120 provides information relating to the appliances within the kitchen and when they were last updated by the current property owner. In this step, the drone device 120 determines to provide this information based on appliance information being included within the property data 322, and based on user preferences within the user data 326 reflecting a preference for new renovations.

Referring now to step (5), after providing the user 102 with an overview of the kitchen, the drone device 120 then guides the user 102 to the den of the property 310. This decision is based on the tour path within the tour data 324 indicating that the den is the next region of the tour path after the dining room.

After navigating to the den, the user provides a command to navigate to a different region of the property 310 before the drone device 120 has an opportunity to provide information relating to then. In the figure, two examples are shown to illustrate that the drone device 120 can perform different navigation functions responsive to the particular command sent by the user. For example, if the user 102 transmits command (A) requesting to see the backyard, then the drone device 120 adjusts the pre-configured tour path indicated in the tour data 324 and instead begins to navigate to the backyard of the property 310 as requested. Alternatively, if the user transmits command (B) requesting to see the garage, the drone device 120 instead begins to navigate to the garage of the property 310 as requested.

In the two examples depicted in step (5), the drone device 120 adjusts the pre-configured tour to customize the tour path in accordance with a query submitted by the user. In addition to adjusting its navigation, the drone device 120 may then use location awareness techniques to further adjust the information that is presented to the user 102 when the drone device 120 arrives at a new location. For example, the drone device 120 may automatically identify the new location, and in response, filter the property information for the new location to identify relevant information that can be provided for output to the user.

Although not explicitly illustrated in the figure, in some implementations, the drone device 120 may perform actions that are responsive to other types of user commands/queries that are received during the automated property tour. For example, if the user 102 requests to see if an appliance 134 operates functionally when he/she is in the kitchen, then the drone device 120 may automatically transmit a command to turn on the appliance 134 in response to the received user request. In this example, the drone device 120 may transmit a signal to the appliance 134 through network 105 as described above with respect to FIG. 1. In another example, if the user 102 transmits a request to adjust the current set point temperature within the property 310, the drone device 120 may automatically transmit an instruction to the monitor control unit 110 to automatically adjust the heating/cooling operations being performed by HVAC system of the property 310. In both of these examples, the drone device 120 is capable of receiving and processing ad-hoc user commands during the automated property tour and dynamically adjusting the operations of specific devices within the property 310 responsive to the received user commands.

Figure 4:
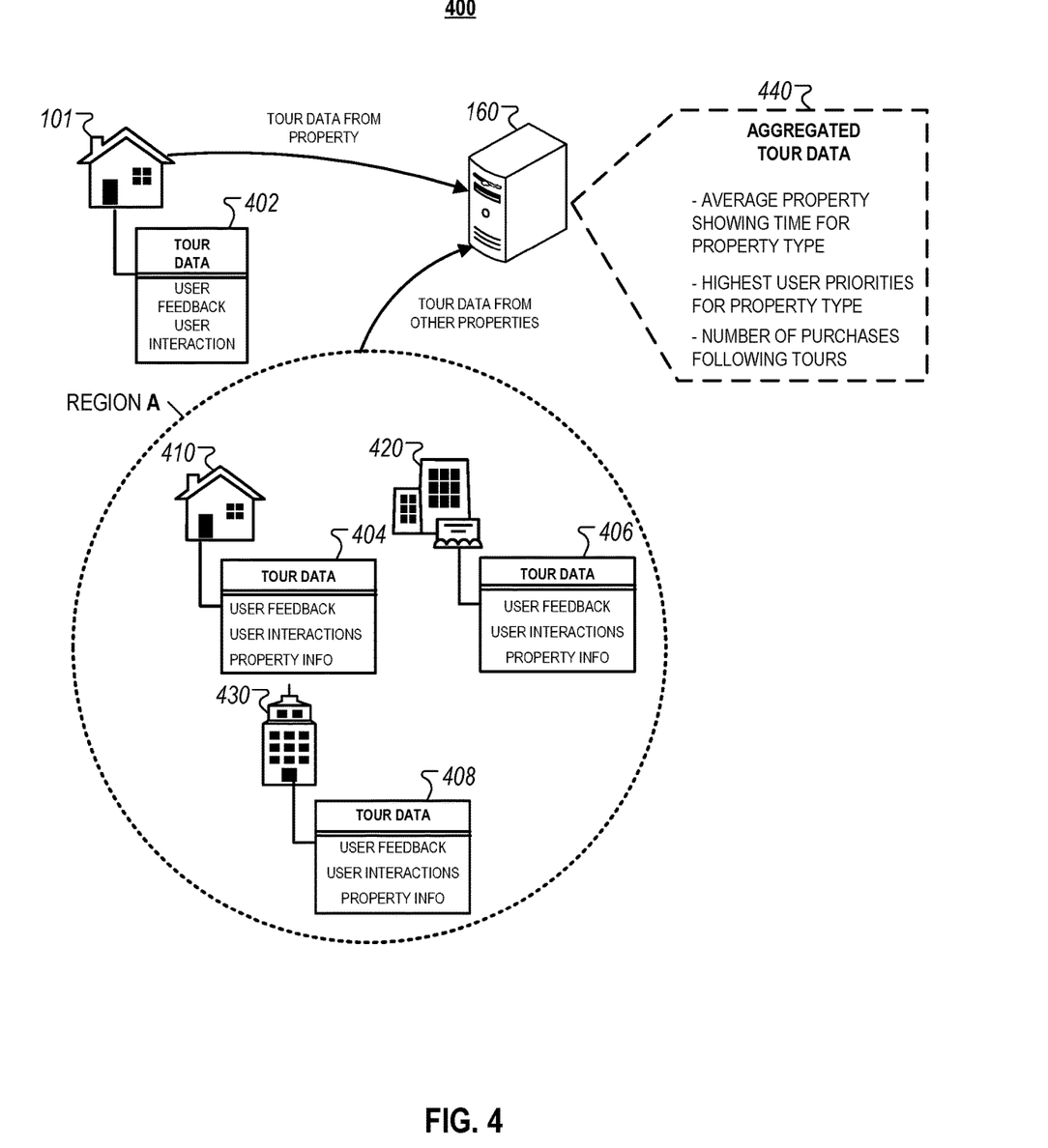
FIG. 4 illustrates an example of a system that is capable of aggregating automated property tour data across multiple properties within a region.

FIG. 4 illustrates an example of a system 400 that is capable of aggregating property tour data across multiple properties within a region. As illustrated, the property management server 160 may be capable of aggregating tour data across multiple automated property tours for a single property as well as aggregating tour data for multiple properties within a single region. The aggregated data can then be used to identify property-specific and/or region-specific trends that are reflective of user preferences and/or feedback when participating in an automated property tour.

In the example depicted, the property management server 160 may obtain tour data 402 from the property 101 as described above. The tour data 402 may include user feedback data relating to prior property tours performed at the property 101, user interaction data collected by the sensors 132 within the property, or data collected by the sensors placed on the drone device 120. Examples of user interaction data can include the total time of an automated property tour, average respective time spent in different regions of the property 101, types of questions asked by the user 102 during the automated property tour, movement data throughout the property, among others.

In addition, the property management server 160 may also obtain tour data 404, 406, and 408 from properties 410, 420, and 430, respectively. The properties 410, 420, and 430 can represent different types of properties that are provided for sale or rent within a common region A. The obtained tour data 404, 406, and 408 can reflect similar data as described above.

After obtaining raw tour data from multiple properties and/or multiple users, property management server 160 then processes the raw tour data to generate aggregated tour data 440. In some implementations, the property management server 160 may aggregate prior property tour data across multiple users for a single property in order to identify potential deficiencies in an existing tour path. In addition, the property management server 160 may also identify similar user actions and/or commands to identify common user concerns and/or user preferences for the property. In this regard, the aggregated tour data 440 for a single property enables the property administrator to gather intelligence relating to how to best configure subsequent property tours.

In some implementations, the property management server 160 may also aggregate prior property tour data across multiple properties in a common region to identify differences in tour outcomes for different types of properties. As illustrated in the figure, the property management server 160 may identify an average property showing type based on a property type, highest user priorities based on a property type, as well as the purchasing/leasing outcome following an automated property tour.

Figure 5:
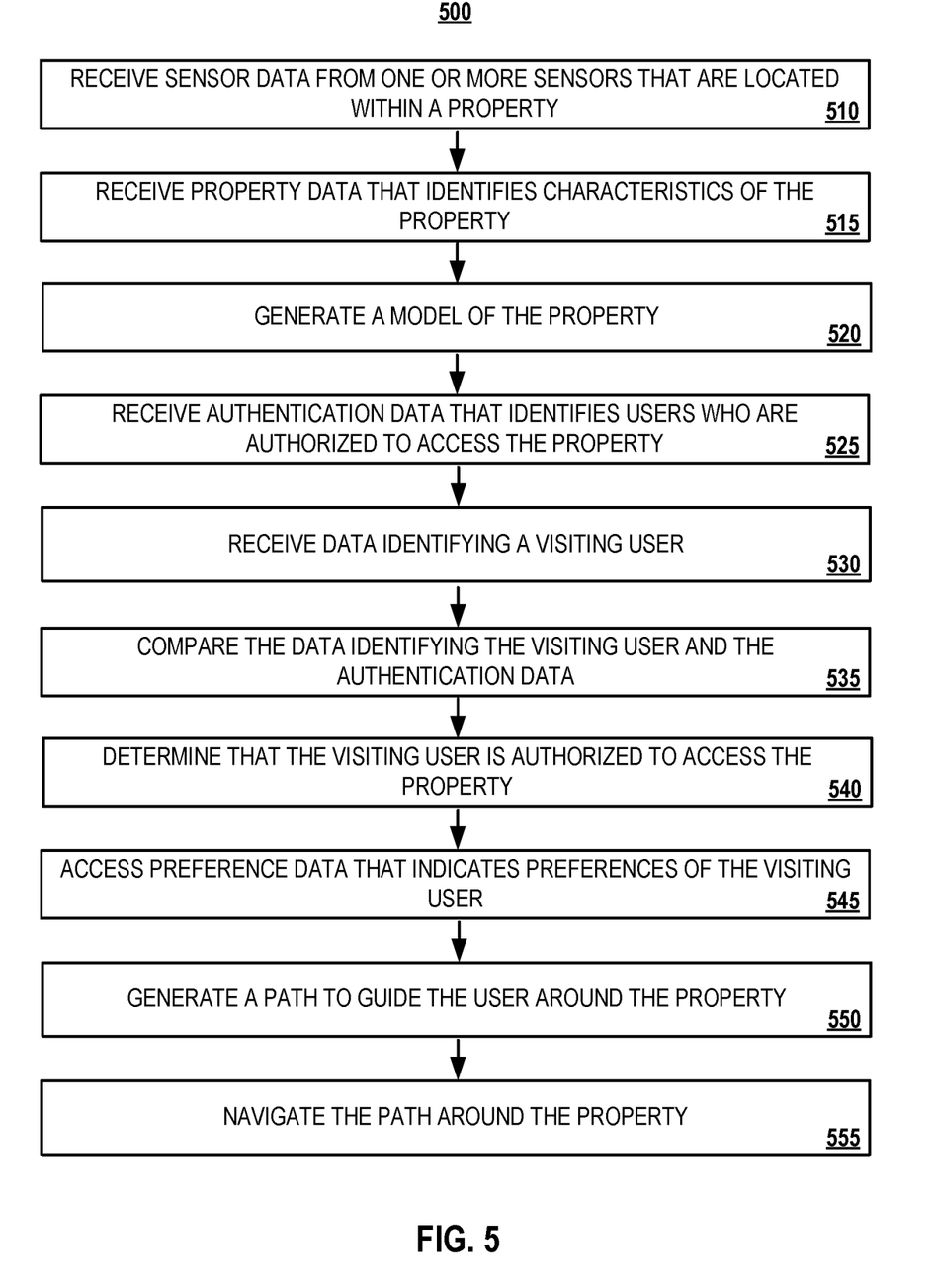
FIG. 5 illustrates an example of a process for automatically navigating a property during a property tour.

FIG. 5 illustrates an example of a process 500 for automatically navigating a property during a property tour. Briefly, the process 500 can include receiving sensor data from one or more sensors that are located within a property (510), receiving property data that identifies characteristics of the property (515), generating a model of the property (520), receiving authentication data that identifies users who are authorized to access the property (525), receiving data identifying a visiting user (530), comparing the data identifying the visiting user and the authentication data (535), determining that the visiting user is authorized to access the property (540), accessing preference data that indicates preferences of the visiting user (545), generating a path to guide the user around the property (550), and navigating the path around the property (555).

Briefly, the process 500 can include receiving sensor data from one or more sensors that are located within a property (510), receiving property data that identifies characteristics of the property (515), generating a model of the property (520), receiving authentication data that identifies users who are authorized to access the property (525), receiving data identifying a visiting user (530), comparing the data identifying the visiting user and the authentication data (535), determining that the visiting user is authorized to access the property (540), accessing preference data that indicates preferences of the visiting user (545), generating a path to guide the user around the property (550), and navigating the path around the property (555).

In general, the operations of the process 500 are described below in reference to the system 100, although any property management system can be configured to perform such operations. In some implementations, the operations are performed by a single component of the system 100, such as the monitor control unit 110, the application server 150, or the drone device 120. In other implementations, the operations are performed by multiple components of the system 100, such as a combination of one or more of the monitor control unit 110, the drone device 120, and the application server 150. For example, the monitor control unit 110 can collect and process sensor data collected by the sensors 132 prior to an automated property tour and provide the processed sensor data to the application server 150. The application server 150 can access property data from the property management server 160, determine that a visiting user is authorized to access the property 101, and generate a path to guide the user 102 of the property 101. In this example, the drone device 120 can be configured to receive data identifying the path of guide the user 102 around the property 102 and navigate the path to provide an automated tour of the property 101. The descriptions below are in reference to the system 100 for simplicity.

In more detail, the process 500 can include the operation of receiving sensor data from one or more sensors that are located within a property (510). The system 100 can receive sensor data collected by the sensors 132 that are located through the property 101. As discussed above, the sensor data can include various types of information that represents a monitored condition of the property, such as an ambient temperature of the property, lighting conditions, settings and/or configurations of the appliances 134 that are connected to the system 100, occupancy data indicating whether the property 101 is presently occupied, and/or historical data identifying usage patterns associated with the property 101, e.g., regions of the property that are most occupied by individuals, emergency consumption patterns, water usage patterns, etc. The sensor data is received by one or more of the monitor control unit 110, the drone device 120, or the application server 150.

The process 500 can include the operation of receiving property data that identifies characteristics of the property (515). For example, the system 100 can receive property data from one or more of the monitor control unit 110, the drone device 120, or the property management server 160. As discussed above, the property data can include various types of information associated with a listing of a property 101 that is of interest to a visiting user such as the user 102. For example, the property data can include a purchase price, square footage, renovation information, neighborhood information, etc. In some instances, the property data can also identify the number of regions within a property, e.g., number of bedrooms, bathrooms, that can be used to generate a three-dimensional spatial representation of the property 101, as discussed above and in more detail below.

The process 500 can include the operation of generating a model of the property (520). The system 100 can generate a model of the property 101 based on the sensor data and the property data received in steps 510 and 515, respectively. For example, in some instances, the model is a three-dimension spatial representation of the property 101 that is used by the drone device 120 to navigate along a specified path while performing an automated tour of the property 101. In such instances, the model of the property can locations of certain features, such as usage patterns of regions of the property, locations of the appliances 134 that are connected to the system 100, that can be useful to determine a path for navigating the property during an automated tour.

In some implementations, the system 100 can generate the model of the property based on processing the contents of the sensor data and/or the property data received in steps 510 and 515. One or more of the monitor control unit 110, the drone device 120, or the application server 150 can identify user behavioral patterns that are represented within one or more regions of the property 101, e.g., the kitchen, the living room, bedrooms. For example, an occupant's usage patterns associated with lights that are turned on and off can be used to determine the regions of the property 101 that are most occupied by the user, which is then used to determine that these properties represent highly occupied regions such as the living room and bedroom. The monitor control unit 110 can also obtain property data that identifies locations of the appliances 134 within the one or more regions of the property that are connected to the system 100. For example, the monitor control unit 110, the drone device 120, or the application server 150 can determine that a particular region represents a kitchen if it is determined to include a refrigerator, an oven, and other kitchen-related appliances. As discussed above, in such implementations, the model of property 101 is determined based on the usage patterns of the property 101 indicated within the received sensor data and/or the locations of the devices that are connected to the system 100.

In some implementations, the system 100 generates the model of the property 101 by using the techniques discussed above to classify each region of the property 101 within a known floorplan. For instance, the monitor control unit 110, the monitor control unit 110, the drone device 120, or the application server 150 can assign a classification label to each of the one or more regions of the property 101 based on the usage patterns of a particular region of the property and the devices connected to the monitoring system that are located in the particular region of the property 101. As an example, the system 100 can identify that a region of a floorplan of the property 101 corresponds to a kitchen based on determining that an occupant utilizes the region during time periods corresponding to breakfast and dinner and based on determining that the space occupied by the region within the floorplan includes kitchen-related appliances.

The process 500 can include the operation of receiving authentication data that identifies users who are authorized to access the property (525). The system 100 can obtain authentication data that is stored in the monitor control unit 110 as account data associated with the system 100, or alternatively, from the property management server 160. In the first example, the authentication data can include a list of authorized individuals that a property administrator has authorized access to the property 101, e.g., occupants, neighbors, guest, among other types of individuals that are known to the property administrator. In the second example, the authentication data can include the account information for a visiting user that is associated with a property listing for the property 101, e.g., a user that has scheduled a tour of the property 101 as a part of an open house. The authentication data can include verified credential data for the authorized users that have been granted access to the property 101.

The process 500 can include the operation of receiving data identifying a visiting user (530). The system 100 can receive data identifying a visiting user. The identification data can be, for example, user input data that is provided by the visiting user to prove that he/she is authorized to access the property 101. For example, the user input data can be a code that is provided by the visiting user and is provided by a property administrator to verify that a user has access to the property. In other examples, the user input data can be a username and password combination, a PIN code, a QR code, or any other type of identifier that is associated with a user account of the visiting user.

The process 500 can include the operation of comparing the data identifying the visiting user and the authentication data (535). The system 100 can compare the authentication data for verified users that have access to the property and the user input data provided to the user. The comparison can involve ensuring that a submitted credential specified by the user input data matches a verified credential associated authorized users specified within the authentication data.

The process 500 can include the operation of determining that the visiting user is authorized to access the property (540). For example, as discussed above, the system 100 can determine that the visitor is authorized to access the property 101 if a submitted credential specified within the user input data provided by the visiting user matches a verified credential of an authorized user that is specified by the authentication data. In some instances, the visiting user can arrive at the property 101 for a scheduled property tour, and the drone device 120 can request the visiting user to provide verification information confirm his/her identity.

In some implementations, the drone device 120 can request the user 102 to provide a one-time passcode that is associated with a scheduled appointment. In other implementations, the drone device 120 can collect biometric and/or facial verification data from the visiting user and compare the collected data against user credential data stored at the application server 150 and/or the property management server 160, which is also specified by the authentication data. In In some implementations, the drone device 120 can determine that the visiting user is authorized to access the property based on verifying an associated device, such as the device 140. In such implementations, the drone device 120 can communicate with an application on the device 140, the application server 150, and/or the property management server 160 to verify the user is authorized to view the property. The property management server 160 and/or the application server 150 may compare data stored on either server with data stored on the device 140 to confirm that the device 140 corresponds to the user 102 who was previously authorized to tour the property. For example, the data may include a code previously provided by the property management server 160 and/or the application server 150 when the user 102 requested the tour.

The process 500 can include the operation of accessing preference data that indicates preferences of the visiting user (545). For example, the system 100 can access preference data that indicates preferences of the visiting user during a property tour. The preference data can include a set of user preferences and user priorities for an ideal property that were previously identified based on user activity data on an account of the visiting user (e.g., prior listing searches, user profile information, user submissions on surveys, etc.).

The process 500 can include the operation of generating a path to guide the user around the property (550). As discussed above, the system 100 can generate the path based on the model of the property and the preferences of the visiting user. In some instances, the system 100 generates a customized path based on the preferences of the visiting user and a present condition of the property 101 that is determined based on the property data, the sensor data, and/or other types of monitoring data. For example, the system 100 can identify regions of the property 101 that are of most interest to the visiting user, and adjust a pre-configured path that was specified and/or configured by the property administrator of the property 101. In other instances, if the system 100 determines that the preference data is insufficient to generate a custom path, the system 100 can instead obtain data specifying the pre-configured path for navigating the property 101.

The system 100, in various implementations, can generate the path using different techniques as discussed above. The path can be generated by the monitor control unit 110, the drone device 120, the application server 150, or a combination thereof. In some implementations, generating the path involves determining tour path parameters based on the preference data and the model of the property 101. For example, the system 100 can determine a first tour parameter that identifies one or more regions of the property to navigate through the path, e.g., regions of the property 101 specified within a floorplan that are of interest to the visiting user, and a second tour parameter identifying a specified path for navigating the one or more regions of the property 101, e.g., an order in which to navigate the visiting user through each of the one or more regions of the property 101. In some implementations, the tour parameters can also include a third tour parameter that identifies a respective time period for navigating each of the one or more regions of the property 101. In such implementations, more important regions of the property 101, e.g., regions that correspond to preferred regions specified within the preference data for the visiting user, can have tour parameters that specify greater time periods compared to less important regions of the property 101.

In some implementations, the system 100 can add or remove certain regions of the property 101 from the generated path that are unlikely to help the visiting user during the property tour. For example, the preference data can indicate that the visiting user has a preference against pets. In this example, if the sensor data indicates that a particular region of the property 101 is occupied by a pet, then the system 100 generates the path by determining that the particular region of the property 101 is not suitable for viewing by the visiting user, and then adjusts a pre-configured path that is specified by a property administrator of the property 101 to remove the particular region of the property from the path to guide the user around the property 101.

The process 500 can include the operation of navigating the path around the property (555). For example, as discussed above, the drone device 120 can be configured to navigate the path around the property 101 to provide an automated tour of the property 101 to the visiting user.

In some implementations, the drone device 120 can be configuring to provide various interactive features while navigating the path around the property 101. For example, while navigating the path around the property 101, the drone device 120 can obtain a voice query that) is provided by the visiting user and relates to a particular region of the property, e.g., the kitchen. The drone device 120 can then access a repository that specifies text segments for each region of the property, e.g., text segments that specify information associated with the kitchen. The drone device 120 can then determine that a particular text segment specified in the repository is associated with the particular region of the property, and responsive to the voice query provided by the visiting user, e.g., a text segment that provides information on the age of a particular kitchen appliance in response to receiving a query requesting this piece of information. The drone device 120 can then generate audio data corresponding to a speech output for the particular text segment, e.g., audio data that provides a spoken output of the information for the kitchen application, and provides the audio data for output to the visiting user while navigating the path around the property 101.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed application-specific integrated circuits (ASICs).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed:

1. A monitoring system comprising:
one or more sensors that are located throughout a property;
a computing device that is configured to:
receive sensor data from the one or more sensors;
receive property data that identifies characteristics of the property;
based on the sensor data and the property data, generate a model of the property;
receive authentication data that identifies users who are authorized to access the property;
receive, from a visiting user, data identifying the visiting user;
compare the data identifying the visiting user to the authentication data;
based on comparing the data identifying the visiting user to the authentication data, determine that the visiting user is authorized to access the property;
obtain tour path data specifying a pre-configured path for navigating the property, the pre-configured path being specified by a property administrator of the property; and
based on the model of the property and the pre-configured path, generate a path to guide the user around the property; and
a drone device that is configured to:
receive data identifying the path to guide the visiting user around the property; and
navigate the path around the property.

2. The system of claim 1, wherein:
the computing device is configured to generate the path to guide the visiting user around the property by determining, based on the tour path data and the model of the property:
a first tour parameter identifying one or more regions of the property to navigate through the path; and
a second tour parameter identifying a specified path for navigating the one or more regions of the property.

3. The system of claim 2, wherein the computing device is configured to generate the path to guide the user around the property by determining, based on the tour path data and the model of the property, a third tour parameter identifying a respective time period for navigating each of the one or more regions of the property.

4. The system of claim 1, wherein the computing device is configured to generate the path to guide the user around the property by:
accessing preference data that indicates preferences of the visiting user;
determining that the preference data is insufficient to generate a custom path that is generated based on the preferences of the visiting user; and
wherein the tour path data is obtained in response to determining that the preference data is insufficient to generate the custom path.

5. The system of claim 1, wherein the computing device is configured to generate the path to guide the user around the property by adjusting the pre-configured path that is specified by a property administrator of the property.

6. The system of claim 1, wherein:
the computing device is further configured to access preference data indicating that the visiting user has a preference against pets;
the sensor data indicates that a particular region of the property is occupied by a pet; and
the computing device is configured to generate the path to guide the user around the property by:
determining that the particular region of the property is not suitable for viewing by the visiting user based on the preference data indicating that the visiting user has a preference against pets and the sensor data indicating that the particular region of the property is occupied by the pet; and
adjusting the pre-configured path to remove the particular region of the property from the path to guide the user around the property.

7. The system of claim 1, wherein:
the computing device is further configured to access preference data indicating that the visiting user has a preference for a particular property region; and
the computing device is configured to generate the path to guide the user around the property by:
identifying a particular region of the property that corresponds to the preferred property region indicated within the preference data; and
generating the path such that the drone is configured to navigate to the particular region of the property before other regions of the property that are included in the generated path and are not the particular region of the property.

8. The system of claim 1, wherein:
the computing device is further configured to access preference data indicating that the visiting user has a preference for a particular property region; and
the computing device is configured to generate the path to guide the user around the property by:
identifying a particular region of the property that corresponds to the preferred property region indicated within the preference data; and
generating the path such that the drone is configured to navigate to the particular region of the property for a longer time period relative to the time period for other regions of the property that are included in the generated path and are not the particular region of the property.

9. The system of claim 1, wherein the computing device is configured to determine that the visiting user is authorized to access the property by:
identifying, within the authentication data, verified credentials of users who are authorized to access the property;
obtaining user input data that indicates a credential submitted by the visiting user; and
determining that the credential submitted by the visiting user matches at least one of the verified credentials of users who are authorized to access the property.

10. The system of claim 1, wherein the drone device is further configured to:

obtain, while performing navigating the path around the property, a voice query that (i) is provided by the visiting user and (ii) relates to a particular region of the property;

access a repository that specifies text segments for each region of the property;

determine that a particular text segment specified in the repository is (i) associated with the particular region of the property, and (ii) responsive to the voice query provided by the visiting user;

generate audio data corresponding to a speech output for the particular text segment; and provide the audio data for output to the visiting user while navigating the path around the property.

11. The system of claim 10, wherein the drone device is further configured to:

adjust, based on the voice query provided by the visiting user, the path to guide the user around the property that was generated by the computing device.

12. The system of claim 1, wherein the computing device is configured to generate the model of the property by:

receiving sensor data that is (i) collected by the drone device and (ii) indicates a three-dimensional spatial representation of the property; and generating the model of the property based on the sensor data collected by the drone device.

13. The system of claim 1, wherein the drone device is further configured to:

receive, from the visiting user, data identifying the visiting user;

compare the data identifying the visiting user to the authentication data; and based on comparing the data identifying the visiting user to the authentication data, determine that the visiting user is authorized to access the property.

14. The system of claim 1, wherein:

the sensor data indicates usage patterns within one or more regions of the property;

the property data identifies locations of devices within the one or more regions of the property that are connected to the monitoring system; and the model of the property is determined based on the usage patterns of the property and the locations of the devices that are connected to the monitoring system.

15. The system of claim 14, wherein the computing device is configured to generate the model of the property by assigning, to each region included in the one or more regions of the property, a respective classification label based on (i) usage patterns within a particular region of the property and (ii) devices connected to the monitoring system that are located in the particular region of the property.

16. A method performed by one or more computers, the method comprising:

receiving sensor data from one or more sensors that are located within a property;

receiving property data that identifies characteristics of the property;

based on the sensor data and the property data, generating a model of the property;

receiving authentication data that identifies users who are authorized to access the property;

receiving, from a visiting user, data identifying the visiting user;

comparing the data identifying the visiting user to the authentication data;

based on comparing the data identifying the visiting user to the authentication data, determining that the visiting user is authorized to access the property;

obtaining tour path data specifying a pre-configured path for navigating the property, the pre-configured path being specified by a property administrator of the property;

based on the model of the property and the pre-configured path, generating a path to guide the user around the property; and navigating the path around the property.

17. The method of claim 16, wherein:

generating the path to guide the user around the property comprises determining, based on the tour path data and the model of the property:

a first tour parameter identifying one or more regions of the property to navigate through the path; and a second tour parameter identifying a specified path for navigating the one or more regions of the property.

18. The method of claim 17, wherein generating the path to guide the user around the property comprises determining, based on the tour path data and the model of the property, a third tour parameter identifying a respective time period for navigating each of the one or more regions of the property.

19. The method of claim 16, wherein generating the path to guide the user around the property comprises:

accessing preference data that indicates preferences of the visiting user;

determining that the preference data is insufficient to generate a custom path that is generated based on the preferences of the visiting user; and wherein the tour path data is obtained in response to determining that the preference data is insufficient to generate the custom path.

20. The method of claim 16, wherein generating the path to guide the user around the property comprises adjusting the pre-configured path that is specified by a property administrator of the property.

21. A method performed by one or more computers, the method comprising:

receiving sensor data from one or more sensors, wherein the sensor data indicates usage patterns within one or more regions of a property;

receiving property data that identifies characteristics of the property, wherein the property data identifies locations of devices within the one or more regions of the property that are connected to a monitoring system;

based on the sensor data and the property data, generating a model of the property, wherein the model of the property is determined based on the usage patterns of the property and the locations of the devices that are connected to the monitoring system;

receiving authentication data that identifies users who are authorized to access the property;

receiving, from a visiting user, data identifying the visiting user;

comparing the data identifying the visiting user to the authentication data;

based on comparing the data identifying the visiting user to the authentication data, determining that the visiting user is authorized to access the property; accessing preference data that indicates preferences of the visiting user; and based on the model of the property and the preferences of the visiting user, generating a path to guide the user around the property; and receiving data identifying the path to guide the visiting user around the property; and navigating the path around the property.

22. A method performed by one or more computers, the method comprising:

receiving sensor data from one or more sensors;

receiving property data that identifies characteristics of a property;

based on the sensor data and the property data, generating a model of the property, wherein the model of the property is generated by assigning, to each of one or more regions of the property, a respective classification label based on (i) usage patterns within a particular region of the property and (ii) devices that are located in the particular region of the property;

receiving authentication data that identifies users who are authorized to access the property;

receiving, from a visiting user, data identifying the visiting user;

comparing the data identifying the visiting user to the authentication data;

based on comparing the data identifying the visiting user to the authentication data, determining that the visiting user is authorized to access the property;

accessing preference data that indicates preferences of the visiting user; and based on the model of the property and the preferences of the visiting user, generating a path to guide the user around the property; and receiving data identifying the path to guide the visiting user around the property; and navigating the path around the property.

* * * * *